July 25, 1933.  L. H. CHURCH  1,919,319
PIPE COUPLER
Filed March 18, 1932   2 Sheets-Sheet 1

INVENTOR-
LEWIS H. CHURCH
BY
Bohleber & Ledbetter
ATTORNEYS

July 25, 1933.  L. H. CHURCH  1,919,319
PIPE COUPLER
Filed March 18, 1932   2 Sheets-Sheet 2

INVENTOR-
LEWIS H. CHURCH
BY
ATTORNEYS

Patented July 25, 1933

1,919,319

UNITED STATES PATENT OFFICE

LEWIS H. CHURCH, OF WESTFIELD, NEW JERSEY, ASSIGNOR TO THE THOMAS & BETTS CO., OF ELIZABETH, NEW JERSEY, A CORPORATION OF NEW JERSEY

PIPE COUPLER

Application filed March 18, 1932. Serial No. 599,642.

This invention relates to a coupler by means of which any cylindrical member, such as a pipe or conduit, may be securely anchored or gripped within an opening in a wall, such as an outlet opening in an outlet box.

An object of the invention is to construct a novel and new mechanism whereby any cylindrical member, and particularly an electrical conduit, may be securely anchored within an opening in a wall and particularly an outlet opening in an outlet box.

Another object of the invention is to construct a pipe coupler utilizing a pair of circular wedges which retain a conduit or pipe eccentrically within an outlet opening, whereby rotation of the conical wedges relatively to each other or rotation of one wedge relatively to the other, wedges the conduit firmly within the outlet opening.

Other objects of the invention will be more apparent from the following description, taken in connection with the accompanying drawings showing a preferred embodiment of the invention, in which:

Figure 7 shows another form of the coupler in which the groove, shown in the couplers of Figures 1 through 6 inclusive, is dispensed with.

The coupling to be described herein is adapted to secure any cylindrical member and particularly a conduit or pipe within an opening in a wall, such as an outlet opening in an outlet box. The coupling makes use of a circular wedging action which effectively anchors the coupling within the opening and, in addition, provides a very simple construction whereby the pipe may be clamped therein.

Figure 1:
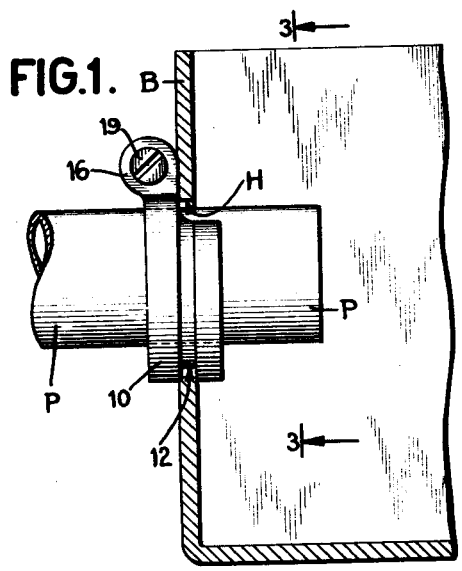
Figure 1 shows a portion of an outlet box in cross-section through an outlet opening showing a conduit or pipe therein secured in position by the coupler.
Figure 2:
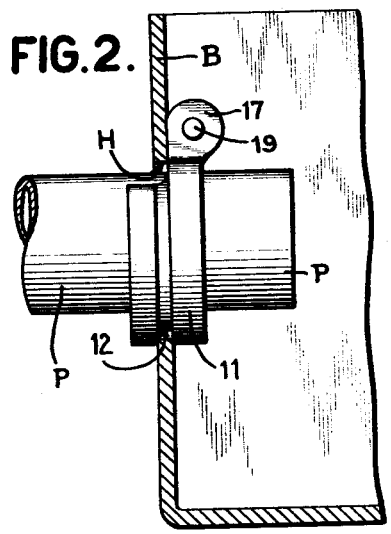
Figure 2 shows a portion of an outlet box in cross-section through an outlet opening, the coupler securing a pipe within the outlet opening with the coupling operating means located within the box.
Figure 3:
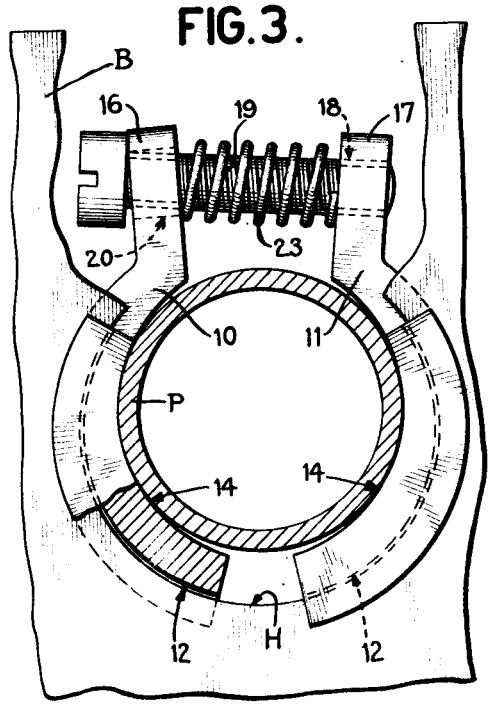
Figure 3 is an enlarged view of the coupling gripping a conduit, taken on the line 3—3 of Figure 1, with portions of the box and coupler broken away to show more clearly the construction of the coupler. The coupler in this view is in position in the outlet opening and before it is tightened to grip the conduit therein.
Figure 4:
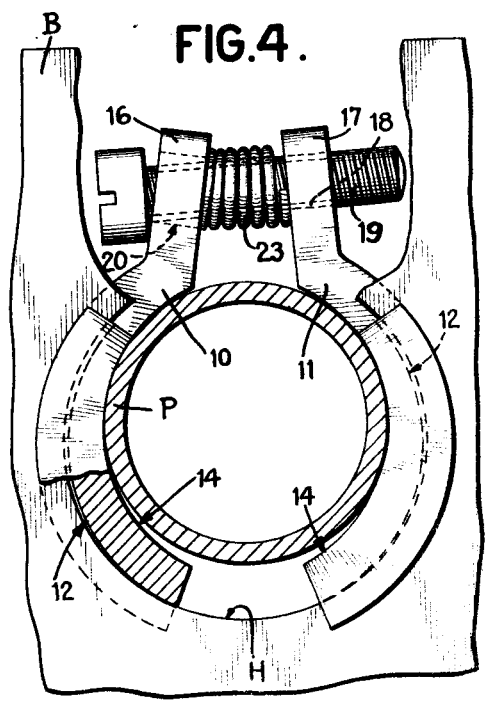
Figure 4 is a view similar to Figure 3, but showing the coupler tightened so that it grips a pipe within the outlet opening.

The coupling shown in Figure 1 comprises a pair of anchorage members 10 and 11 which are shown enlarged in Figure 3. Each anchorage member carries a groove 12 into which groove the edge of the opening H of the box B is received. The groove 12 provides a seat or seating means for the edge of the opening. In the preferred construction the groove 12 is arcuate and thereby forms an arcuate seat corresponding in curvature with the curvature of the opening H in the box B.

Each of the anchorage or clamping members 10 and 11, or particularly the arcuate seat thereof, engages less than a semi-circle of the opening H and also engages less than a semi-circle of the pipe P. The anchorage or clamping members 10 and 11 need not necessarily be semi-circular so long as the arcuate seat is less than a semi-circle. There is a twofold reason for the semi-circular nature of the two clamping members 10 and 11; first when a groove 12 is provided to receive the edge of the opening H, the coupling members must collapse sufficiently so that they may be inserted within the opening H and the edge of the opening inserted within the groove; and the second reason is to enable the anchorage members to be rotated within the opening and about the pipe, as will appear more fully hereinafter.

Each of the anchorage or clamping members 10 and 11 is provided with gripping means which takes the form of a circular pipe receiving portion 14. Preferably the arc of the pipe receiving portion is not less than the circumference or arc of the pipe or conduit to be received and gripped thereby and it may have an arc having a radius greater than the radius of the pipe. The gripping means or pipe receiving portions 14 are positioned eccentrically with respect to the seating means or arcuate seats 12 so that the pipe P received in the pipe receiving portions is held eccentrically with respect to the opening H. It will be observed, therefore, that the anchorage members 10 and 11 provide circular wedges between the edge of the opening H and the outer circumference of the pipe P and the circular wedges hold the pipe P eccentrically with respect to the box hole opening H.

Each of the anchorage members 10 and 11 carries a pair of ears 16 and 17 at the end thereof. The ears 16 and 17 are offset from the groove 12 upon the anchorage members so that they will clear the wall of the box B. The ears 16 and 17 are also provided preferably at the narrower portion of the circular wedges formed by the anchorage members 10 and 11, although it is clear the ears need not be at this portion. The ear 17 carries a threaded hole 18 in which the operating means or screw 19 is threaded. The other ear 16 carries a hole 20 which is relatively larger than the screw 19 so that the screw may pass therethrough irrespective of the angularity between the axis of the screw and the axis of the hole. The preferred operating means has been described and any means which causes circular movement of one or both members relatively to each other is contemplated.

A coil spring 23 surrounds the operating screw 19 and its ends press against the ears 16 and 17 to press them apart or to press them in a direction opposite to the movement given to the ears and anchorage members by the screw 19 when the latter is tightened. The spring releases or helps to release the anchorage members.

As previously discussed, the anchorage members 10 and 11 are inserted within the opening H and the edge of the opening is received within the groove 12 provided therefor. The pipe P is then inserted so that it is seated between the gripping means or pipe receiving portions 14. Tightening of the operating means or screw 19 draws the ears 16 and 17 towards each other which rotates the arcuate wedges formed by the anchorage members 10 and 11 in a direction to bring the narrower portions of each circular wedge towards each other. Incidentally, the wider portions of the circular wedges are moved away from each other as will be understood, so that the adjacent ends of the wedges move relatively to each other in both clamping and opening movements. This movement of the circular wedges reduces the size of the opening between the anchorage members or between the gripping means and clamps the pipe P firmly between the gripping means or pipe receiving portions 14. The circular wedges or anchorage members 10 and 11 are enabled to be rotated towards each other because they are less than a semi-circle which provides space for their circular or rotating movement. It has already been mentioned that the second reason for providing the anchorage members 10 and 11 with arcuate seats which are less than a semi-circle is to enable the insertion of the anchorage members into the box hole opening with the edge of the box wall seating within the groove 12.

Upon loosening the operating screw 19, the spring 23 presses the ears 16 and 17 outwardly and assists in releasing the pipe from within the coupler. It is clear that the operating screw need not necessarily be provided at the narrower end of the circular wedges nor does the operating means need to take the form of a screw. Any operating means is contemplated which causes movement of the narrower ends of the anchorage members 10 and 11 towards each other in order to grip a pipe in the coupler, or causes the narrower ends to move away from each other in order to release a conduit anchored within the coupler and opening H. It seems clear that either of the ends of the circular wedges may be moved relatively to each other and obtain the clamping and releasing action described above.

Figure 7:
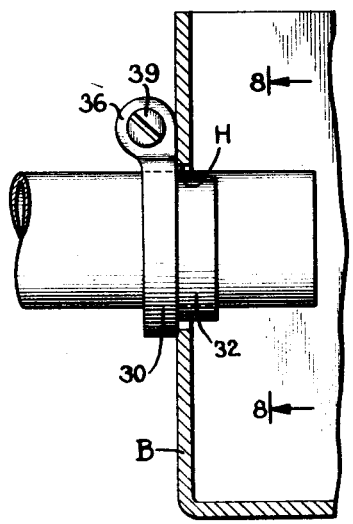
Figure 8:
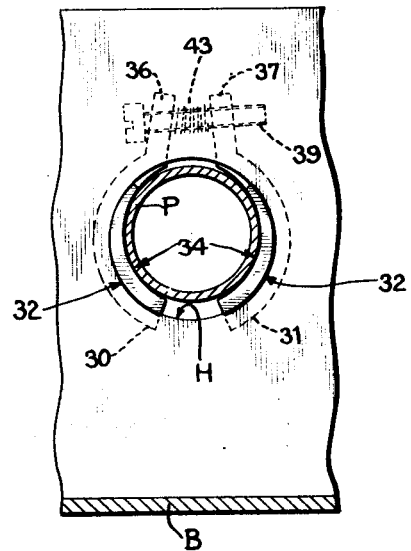
Figure 8 is an end view of the coupler, taken on line 8—8 of Figure 7, showing the coupler of that figure tightened to grip a pipe within the outlet opening of the box.

In Figures 7 and 8 a coupler is shown having anchorage members or circular wedges 30 and 31 in which a groove has been dispensed with. The anchorage members 30 and 31 are provided with an arcuate seat 32 similar to the arcuate seat formed at the bottom of the groove 12. The pipe receiving portions 34 which receive the pipe P and support it eccentrically with respect to the opening H in the box B are similar to the corresponding parts in the coupler shown in Figures 1 through 4.

The ears 36 and 37 with their respective openings, the operating screw 39 and the spring 43, are similar to and operate in the same manner as the corresponding parts of the coupler of Figures 1 through 4 and hence these parts will not be described further. It will be observed that in this construction of coupling the arcuate seats 32 may be inserted into the opening H merely by sliding them thereinto and it is not necessary to bring the members closely together in order to insert them in the opening as in the form having a groove. The anchorage members or circular wedges in this form must be less than a semi-circle in order to enable the circular or rotating movement of the wedges towards each other to grip a pipe therein.

Figure 5:
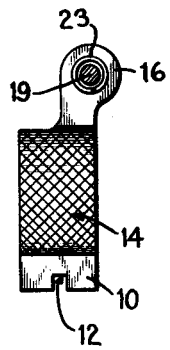
Figure 5 shows one portion of the coupler in plan when viewed from the inner or pipe receiving portion of the coupler.

The pipe receiving portions or gripping means 14 of the coupler are shown in Figure 5 as knurled. The knurling is provided in order to bite through any insulating paint or coating upon the conduit P and to more firmly grip the conduit thereto.

Figure 6:
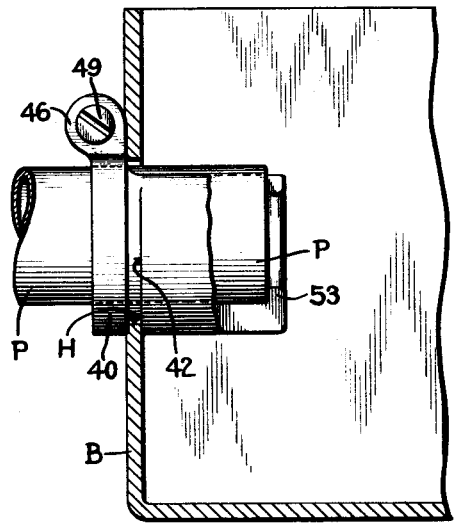
Figure 6 shows another form of the coupler carrying an extension on which there is an inwardly directed ridge forming a bushing on the end of the coupler.

A coupler is shown in Figure 6 having anchorage members 40 carrying a groove 42, as in the form shown in Figures 1 through 4. The anchorage groove is adapted to receive the edge of the opening H in the box B as described above with respect to the groove 12 of Figures 1 through 4. The anchorage members 40 carry the ears 46 and the operating screw 49 similar to that described in Figures 1 through 4, and hence these parts will not be further described. The anchorage members 40 are extended considerably and a ridge or shoulder 53 is directed inwardly to form a bushing against which the end of the pipe P abuts. Although the form of coupler shown in Figure 6 is provided with a groove 42, it is clear that this extension and inwardly directed ridge forming a bushing may be provided upon the grooveless form of coupler shown in Figure 7.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawings, except as indicated in the appended claims.

What is claimed is:

1. A wall assembly comprising a wall having a circular opening therein, a cylindrical member positioned within the opening, a pair of circular wedges between the cylindrical member and the edge of the circular opening and retaining the circular member eccentrically in the opening, ears carried by each wedge at the narrower end thereof, and operating means carried by the ears to pull the ears towards each other and the wedges around the edge of the circular opening to bring the narrower ends of the wedges closer together.

2. A coupler to anchor a pipe in an opening in a wall comprising a pair of circular wedges each having an arcuate seat to engage the edge of the opening in the wall, the arcuate seat forming less than a semi-circle, a pipe receiving portion upon each of the circular wedges and positioned eccentrically with respect to the arcuate seat, operating means carried by the circular wedges and moving the adjacent ends of the circular wedges relatively to each other, and spring means engaging the circular wedges and tending to release the pipe gripping action of the wedges.

3. A coupler to anchor a pipe in an opening in a wall comprising a pair of circular wedges each having an arcuate seat to engage the edge of the opening in the wall, the arcuate seat forming less than a semi-circle, a pipe receiving portion upon each of the circular wedges and positioned eccentrically with respect to the arcuate seat, an ear projecting from the narrower end of each circular wedge, and an operating screw carried by the ears and moving the narrow ends of the circular wedges towards each other to grip a pipe therebetween.

4. A coupler to anchor a pipe in an opening in a wall comprising a pair of anchorage members, an arcuate groove in the periphery of each anchorage member forming an arcuate seat to engage the edge of the opening in the wall, the anchorage members at the groove being less than a semi-circle thereby enabling the insertion of the edge of the opening into the grooves, a substantially arcuate pipe receiving seat upon each of the anchorage members and positioned eccentrically with respect to the arcuate seat formed by the arcuate groove thereby forming circular wedges of the anchorage members, and operating means carried by the anchorage members and moving the adjacent ends thereof circumferentially around the pipe and relatively to each other.

5. A coupler to anchor a pipe in an opening in a wall comprising a pair of anchorage members, an arcuate groove in the periphery of each anchorage member forming an arcuate seat to engage the edge of the opening in the wall, the anchorage members at the groove being less than a semi-circle thereby enabling the insertion of the edge of the opening into the grooves, a substantially arcuate pipe receiving seat upon each of the circular wedges and positioned eccentrically with respect to the arcuate seat thereby forming circular wedges of the anchorage members, an ear projecting from the narrower end of the circular wedge of each anchorage member, and an operating screw carried by the ears and moving the narrow ends of the anchorage members circumferentially around the pipe and the wall opening and towards each other to grip the pipe therein.

6. A coupler to anchor a pipe in an opening in a wall comprising a pair of circular wedges each having an arcuate seat to engage the edge of the opening in the wall, the arcuate seat forming less than a semi-circle, a pipe receiving portion upon each of the circular wedges and positioned eccentrically with respect to the arcuate seat, an ear projecting from the narrower end of each circular wedge, an operating screw carried by the ears and moving the narrow ends of the circular wedges towards each other to grip a pipe therein, and a coil spring surrounding the operating screw and having its ends engaging the ears.

7. A coupler to anchor a pipe in an opening in a wall comprising a pair of circular wedges each having an arcuate seat to engage the edge of the opening in the wall, the arcuate seat forming less than a semicircle, a pipe receiving portion upon each of the circular wedges and positioned eccentrically with respect to the arcuate seat, an inwardly directed shoulder upon the end of each circular wedge forming a bushing against which the end of the pipe abuts, and operating means carried by the circular wedges and moving the adjacent ends of the circular wedges relatively to each other.

8. A coupler to anchor a pipe in an opening in a wall comprising a pair of circular wedges each having an arcuate seat to engage the edge of the opening in the wall, the arcuate seat forming less than a semi-circle, a pipe receiving portion upon each of the circular wedges and positioned eccentrically with respect to the arcuate seat, an extension carried by each anchorage member, an inwardly directed shoulder upon the end of each extension forming a bushing against which the end of the pipe abuts, and operating means carried by the circular wedges and moving the adjacent ends of the circular wedges relatively to each other.

LEWIS H. CHURCH.